(12) United States Patent
Sung

(10) Patent No.: US 11,667,233 B2
(45) Date of Patent: Jun. 6, 2023

(54) LAMP CONTROL DEVICE FOR VEHICLE

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 218 days.

(21) Appl. No.: 17/135,550

(22) Filed: Dec. 28, 2020

(65) Prior Publication Data

US 2021/0197708 A1    Jul. 1, 2021

(30) Foreign Application Priority Data

Dec. 31, 2019  (KR) .................. 10-2019-0179455

(51) Int. Cl.
*B60Q 1/12* (2006.01)
*G06V 10/44* (2022.01)
*G06V 20/58* (2022.01)
*G06V 20/56* (2022.01)
*B60Q 9/00* (2006.01)

(52) U.S. Cl.
CPC ............... *B60Q 1/12* (2013.01); *G06V 10/44* (2022.01); *G06V 20/584* (2022.01); *G06V 20/588* (2022.01); *B60Q 2300/122* (2013.01)

(58) Field of Classification Search
CPC ...... B60Q 9/008; B60Q 9/00; B60Q 2300/42; B60Q 1/08; B60Q 1/50; B60Q 1/0023; B60Q 1/525; B60Q 1/1423; B60Q 1/2665
See application file for complete search history.

(56) References Cited

U.S. PATENT DOCUMENTS

| | | | |
|---|---|---|---|
| 8,536,607 B2 | 9/2013 | Chuang | |
| 9,227,553 B2 | 1/2016 | Nordbruch | |
| 2002/0036907 A1* | 3/2002 | Kobayashi | B60Q 1/16 362/464 |
| 2004/0143380 A1* | 7/2004 | Stam | G06V 20/584 340/467 |
| 2009/0279317 A1* | 11/2009 | Tatara | B60Q 1/08 362/465 |
| 2020/0269748 A1* | 8/2020 | Mimura | B60Q 1/245 |

FOREIGN PATENT DOCUMENTS

KR    10-1057649 B1    8/2011

* cited by examiner

*Primary Examiner* — Wei (Victor) Y Chan
(74) *Attorney, Agent, or Firm* — NovoTechIP International PLLC

(57) ABSTRACT

The present disclosure relates to a device for controlling a lamp for a vehicle. The device may include a lamp controller that determines whether to change a light range control code based on at least one of image information, map information, or illuminance information of a front region of the vehicle, and determines increase or decrease and an increase or decrease amount of the light range control code based on steering information, and a lamp for expanding or reducing a light irradiation range based on the light range control code.

20 Claims, 6 Drawing Sheets

LAMP CONTROL DEVICE FOR VEHICLE

CROSS-REFERENCE TO RELATED APPLICATION

This application claims the benefit of priority to Korean Patent Application No. 10-2019-0179455, filed in the Korean Intellectual Property Office on Dec. 31, 2019, the entire contents of which are incorporated herein by reference.

TECHNICAL FIELD

The present disclosure relates to a lamp control device for controlling a light irradiation range of a headlamp disposed on a vehicle.

BACKGROUND

In general, a beam pattern implemented in a headlamp of a vehicle is largely divided into a low beam and a high beam.

A high beam pattern technology has an adaptive driving beam (ADB) mode. The ADB mode is operated in a high beam mode at ordinary times, and forms a shadow zone when a preceding vehicle appears, thereby securing a comfortable view to a driver of a present vehicle while preventing glare of a driver of another vehicle.

The general ADB mode secures the comfortable view to the driver of the present vehicle while not causing light pollution to the driver of another vehicle in a straight road section based on a nighttime light source recognition algorithm of a front camera. However, the general ADB mode may cause a serious safety problem by causing glare of a driver of a truck, a bus, or the like with a high overall height on a curved lane, especially a curved lane on which a median strip is installed.

SUMMARY

The present disclosure has been made to solve the above-mentioned problems occurring in the prior art while advantages achieved by the prior art are maintained intact.

An aspect of the present disclosure provides a lamp control device for a vehicle that may predict a curvature of a line to change a beam pattern.

Another aspect of the present disclosure provides a lamp control device for a vehicle that expands a light irradiation range by an amount corresponding to a steering angle or a predicted curvature of a line when a vehicle turns left in a section in which a median strip is disposed, and reduces the light irradiation range by an amount corresponding to the steering angle or the predicted curvature of the line when the vehicle turns right.

Another aspect of the present disclosure provides a lamp control device for a vehicle that uses existing sensors installed in a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a lamp for a vehicle includes a lamp controller that determines whether to change a light range control code based on at least one of image information, map information, or illuminance information of a front region of the vehicle, and determines increase or decrease and an increase or decrease amount of the light range control code based on steering information, and the lamp for expanding or reducing a light irradiation range based on the light range control code.

According to another aspect of the present disclosure, a device for controlling a lamp for a vehicle includes a lamp controller that determines whether to change a light range control code based on at least one of image information, map information, or illuminance information of a front region of the vehicle, and determines increase or decrease and an increase or decrease amount of the light range control code based on at least one of the image information or the map information, and a lamp for expanding or reducing a light irradiation range based on the light range control code.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
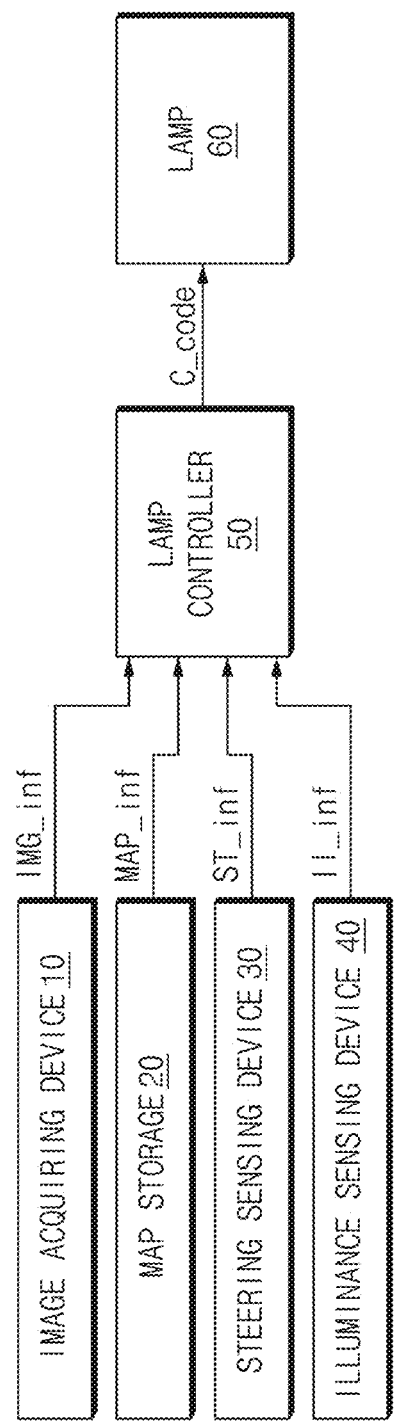
FIG. 1 is a view illustrating a configuration of a lamp control device for a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 6B.

FIG. 1 is a view illustrating a configuration of a lamp control device for a vehicle according to an embodiment of the present disclosure.

Referring to FIG. 1, a lamp control device for a vehicle according to an embodiment of the present disclosure may be implemented inside a vehicle. In this connection, the lamp control device for the vehicle may be integrally formed with internal control units of the vehicle, and may be implemented as a separate device and connected to the control units of the vehicle by separate connecting means.

Referring to FIG. 1, the lamp control device for the vehicle according to an embodiment of the present disclosure may include an image acquiring device 10, map storage 20, a steering sensing device 30, an illuminance sensing device 40, a lamp controller 50, and a lamp 60.

The image acquiring device 10 may include a sensor or a device for acquiring an image of a front region of the vehicle.

For example, the image acquiring device 10 may include a front camera. The front camera may acquire the image of the front region of the vehicle and output the image as image information IMG_inf.

The map storage 20 may include a device for storing information on a road and a terrain around the road.

For example, the map storage 20 may include a shape of the road, line information of the road, and various structures of the road. In this connection, the line information of the road may include a center line, a boundary line, and the like of the road. In addition, the structures of the road may include a traffic light, a sign, a kerb, a road surface mark, a median strip, and the like. In addition, the map storage 20 may be linked with a global positioning system (GPS) to output map information MAP_inf including the shape of the road, the line information, and the information of the various structures for a current location of the vehicle.

The steering sensing device 30 may include a sensor and a device for sensing a travel direction of the vehicle, that is, a steering angle.

For example, the steering sensing device 30 may output the sensed steering angle of the vehicle as steering information ST_inf. In this connection, the steering information ST_inf may include a magnitude and a direction of the steering angle.

The illuminance sensing device 40 may include a sensor and a device capable of sensing exterior illuminance of the vehicle.

For example, the illuminance sensing device 40 is a sensor that senses the exterior illuminance, that is, brightness. The illuminance sensing device 40 may determine that it is daytime when the exterior brightness of the vehicle is equal to or above a reference value, determine that it is nighttime when the exterior brightness of the vehicle is below the reference value, and output the determination result as illuminance information Il_inf.

The lamp controller 50 may receive the image information IMG_inf from the image acquiring device 10. The lamp controller 50 may receive the map information MAP_inf from the map storage 20. The lamp controller 50 may receive the steering information ST_inf from the steering sensing device 30. The lamp controller 50 may receive the illuminance information Il_inf from the illuminance sensing device 40.

The lamp controller 50 may generate a light range control signal C_code based on the image information IMG_inf, the map information MAP_inf, the steering information ST_inf, and the illuminance information Il_inf, and provide the generated light range control signal C_code to the lamp 60.

The lamp controller 50 may determine whether to change the light range control signal C_code in response to the image information IMG_inf, the map information MAP_inf, and the steering information ST_inf based on the image information IMG_inf, the map information MAP_inf, and the illuminance information Il_inf.

For example, when the road which the vehicle is currently traveling on is not a road on which the median strip is installed, when the road is not a curved road, or when it is not the nighttime based on the image information IMG_inf, the map information MAP_inf, and the illuminance information Il_inf, the lamp controller 50 may stop the light range control signal C_code from changing in response to the image information IMG_inf, the map information MAP_inf, and the steering information ST_inf.

When the road which the vehicle is currently traveling on is a curved road on which the median strip is installed, and when it is the nighttime based on the image information IMG_inf, the map information MAP_inf, and the illuminance information Il_inf, the lamp controller 50 may change the light range control signal C_code in response to the image information IMG_inf, the map information MAP_inf, and the steering information ST_inf.

The following will describe a case where the lamp controller 50 changes the light range control signal C_code based on the image information IMG_inf, the map information MAP_inf, and the steering information ST_inf.

The lamp controller 50 may increase or decrease a voltage level of the light range control signal C_code based on the image information IMG_inf, the map information MAP_inf, and the steering information ST_inf. In addition, the lamp controller 50 may increase or decrease an amount of current of the light range control signal C_code based on the image information IMG_inf, the map information MAP_inf, and the steering information ST_inf. In addition, the lamp controller 50 may generate the light range control signal C_code having a code value based on the image information IMG_inf, the map information MAP_inf, and the steering information ST_inf, and increase or decrease the code value of the light range control signal C_code.

Hereinafter, it should be noted that the lamp controller 50 is only to describe the light range control signal C_code as a signal having the code value, and is not limit the light range control signal C_code thereto. In addition, the light range control signal C_code will be described as being named as a light range control code C_code.

The lamp controller 50 may determine whether the vehicle is currently traveling on the road on which the median strip is installed based on at least one of the image information IMG_inf or the map information MAP_inf.

In addition, the lamp controller 50 may determine whether the road which the vehicle is currently traveling on is a straight road or the curved road based on at least one of the image information IMG_inf or the map information MAP_inf, and estimate a curvature of the curved road when the road is the curved road.

The lamp controller 50 may determine whether the curved road is a left turn section or a right turn section based on the image information IMG_inf and the map information MAP_inf, and may increase or decrease the code value of the light range control code C_code based on the determination result. In this connection, the lamp controller 50 may determine an increase or decrease amount in the code value of the light range control code C_code based on the estimated curvature of the curved road.

In one example, the lamp controller 50 may determine the increase or decrease and the increase or decrease amount in the code value of the light range control code C_code based on the steering information ST_inf. Specifically, the lamp controller 50 may increase or decrease the code value of the light range control code C_code based on a steering direction included in the steering information ST_inf. The lamp controller 50 may determine the increase or decrease amount of the code value of the light range control code C_code based on the magnitude of the steering angle included in the steering information ST_inf.

The lamp 60 may emit light in a light irradiation range corresponding to the code value of the light range control code C_code provided from the lamp controller 50.

Figure 2:
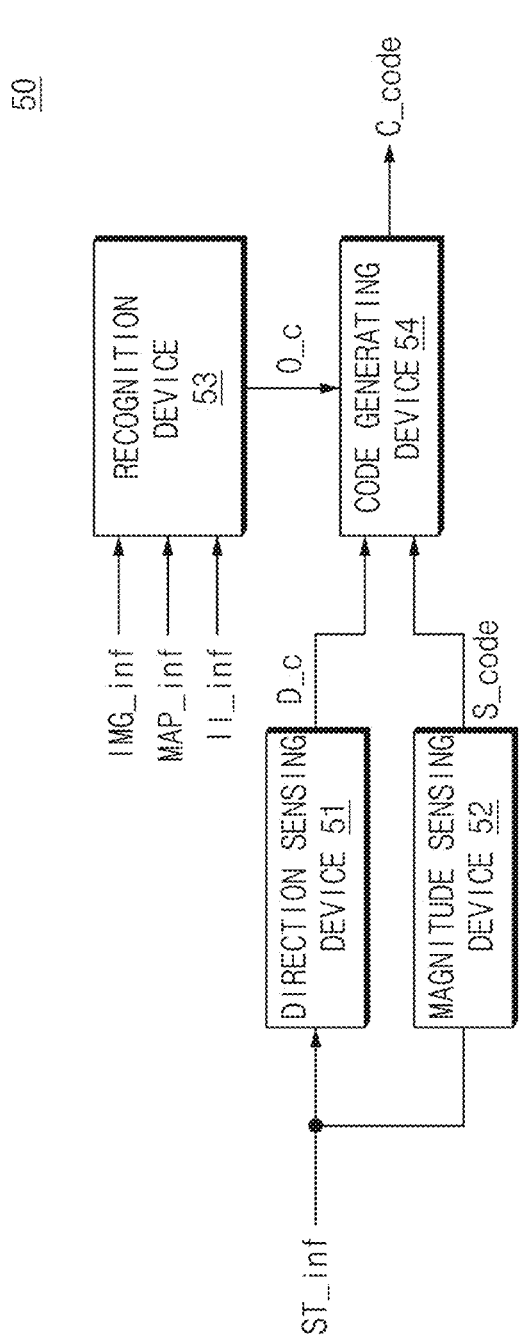
FIG. 2 is a view illustrating an embodiment of a lamp controller in a configuration of a lamp control device for a vehicle according to an embodiment of the present disclosure.
Figure 3:
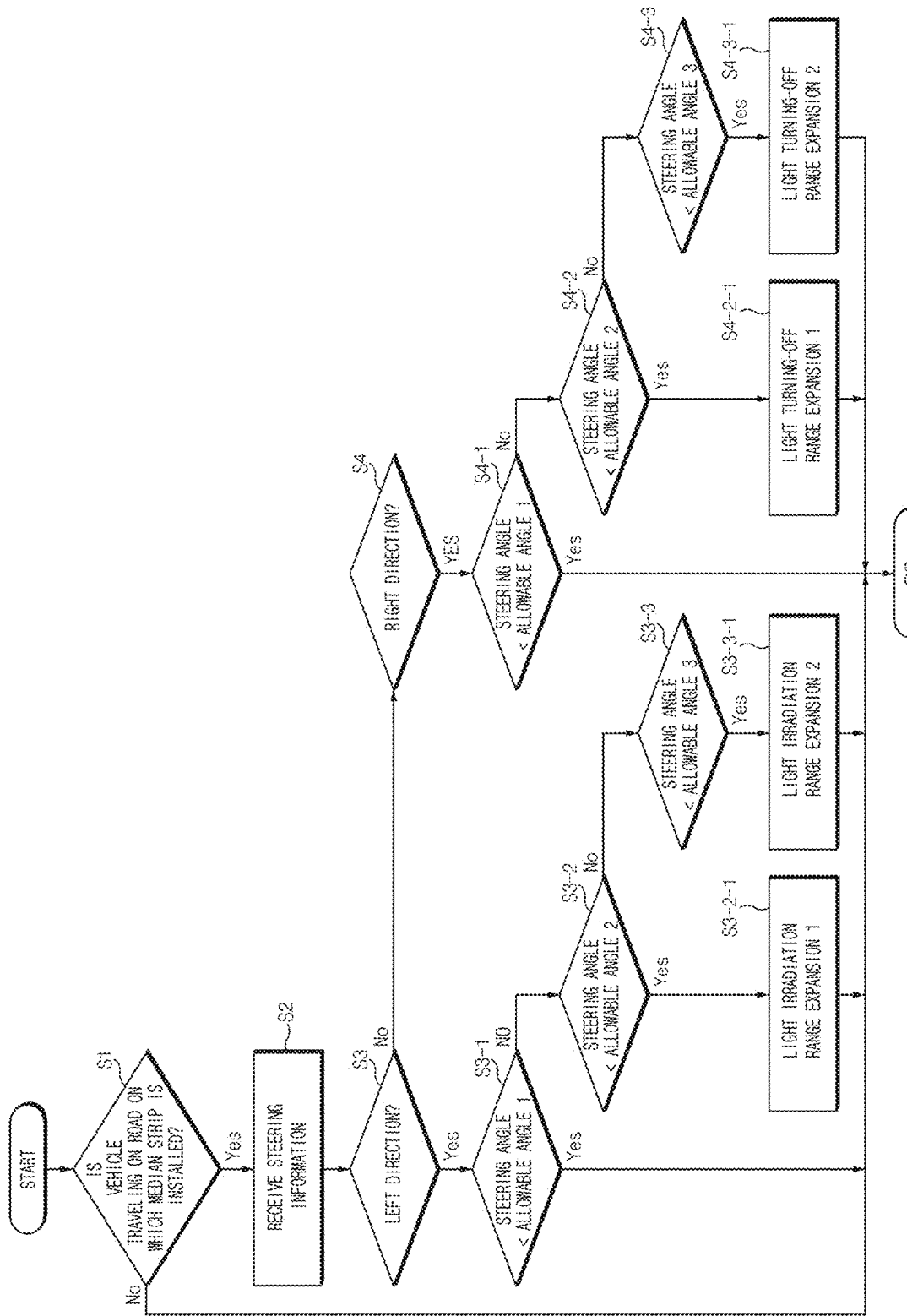
FIG. 3 is a flowchart illustrating a lamp control device for a vehicle including a lamp controller according to an embodiment of the present disclosure.

FIG. 2 is a view illustrating an embodiment of a lamp controller in a configuration of a lamp control device for a vehicle according to an embodiment of the present disclosure.

The lamp controller 50 shown in FIG. 2 may be a component, which is shown as an embodiment, capable of determining the increase or decrease amount in the code value of the light range control code C_code based on the steering information ST_inf, and increasing or decreasing the code value of the light range control code C_code based on the determined increase or decrease amount.

Referring to FIG. 2, the lamp controller 50 may include a direction sensing device 51, a magnitude sensing device 52, a recognition device 53, and a code generating device 54.

The direction sensing device 51 may sense the steering direction included in the steering information ST_inf and generate a direction sensing signal D_s.

For example, the direction sensing device 51 may enable the direction sensing signal D_s when the steering direction included in the steering information ST_inf is a left direction.

On the other hand, the direction sensing device 51 may disable the direction sensing signal D_s when the steering direction included in the steering information ST_inf is a right direction.

The magnitude sensing device 52 may increase or decrease a code value of a magnitude code S_code based on the magnitude of the steering angle included in the steering information ST_inf.

For example, the magnitude sensing device 52 may increase the code value of the magnitude code S_code when the magnitude of the steering angle increases.

On the other hand, the magnitude sensing device 52 may reduce the code value of the magnitude code S_code when the magnitude of the steering angle decreases.

The recognition device 53 may generate a code generating signal O_c based on the image information IMG_inf, the map information MAP_inf, and the illuminance information II_inf.

For example, the recognition device 53 may enable the code generating signal O_c when it is determined that the vehicle is currently traveling on the curved road on which the median strip is installed in the nighttime based on the image information IMG_inf, the map information MAP_inf, and the illuminance information II_inf.

When it is not the nighttime traveling, when the vehicle is not traveling on the road on which the median strip is installed, or when the vehicle is not traveling on the curved road based on the image information IMG_inf, the map information MAP_inf, and the illuminance information II_inf, the recognition device 53 may disable the code generating signal O_c.

More specifically, the recognition device 53 may determine whether the vehicle is currently traveling on the curved road on which the median strip is installed based on at least one of the image information IMG_inf or the map information MAP_inf. That is, the recognition device 53 may determine whether the image of the front region of the vehicle is the curved road on which the median strip is installed based on the image information IMG_inf. In addition, the recognition device 53 may determine whether the road which the vehicle is currently traveling on is the curved road on which the median strip is installed based on the map information MAP_inf. Preferably, it may be most accurate for the recognition device 53 to determine whether the vehicle is traveling on the curved road on which the median strip is installed based on the image information IMG_inf and the map information MAP_inf.

The recognition device 53 may distinguish the nighttime and the daytime from each other based on the illuminance information II_inf.

Therefore, the recognition device 53 may determine whether the vehicle is currently traveling on the curved road on which the median strip is installed in the nighttime based on the image information IMG_inf, the map information MAP_inf, and the illuminance information II_inf, and enable the code generating signal O_c.

When the code generating signal O_c is disabled, the code generating device 54 may stop generation of the light range control code C_code regardless of the direction sensing signal D_s and the magnitude code S_code.

On the other hand, when the code generating signal O_c is enabled, the code generating device 54 may generate a light range control code C_code based on the direction sensing signal D_s and the magnitude code S_code.

A. For example, when the code generating signal O_c is enabled, the code generating device 54 may increase or decrease the code value of the light range control code C_code based on the direction sensing signal D_s by a code value corresponding to the code value of the magnitude code S_code.

More specifically, when the code generating signal O_c is enabled and the direction sensing signal D_s is enabled, the code generating device 54 may increase the code value of the light range control code C_code by the code value corresponding to the code value of the magnitude code S_code.

When the code generating signal O_c is enabled and the direction sensing signal D_s is disabled, the code generating device 54 may reduce the code value of the light range control code C_code by the code value corresponding to the code value of the magnitude code S_code.

Therefore, when it is determined that the vehicle is currently travelling on the curved road on which the median strip is installed in the nighttime based on the image information IMG_inf, the map information MAP_inf, and the illuminance information II_inf, the lamp controller 50 may increase or decrease the code value of the light range control code C_code based on the steering information ST_inf. In this connection, the lamp controller 50 may determine the increase or decrease amount of the light range control code C_code and the increase or decrease of the light range control code C_code based on the steering information ST_inf.

Eventually, when it is determined that the vehicle is currently travelling on the curved road on which the median strip is installed in the nighttime based on the image information IMG_inf, the map information MAP_inf, the steering information ST_inf, and the illuminance information II_inf, and when the vehicle is turning left, the lamp controller 50 may expand the light irradiation range by increasing the code value of the light range control code C_code.

On the other hand, when it is determined that the vehicle is currently travelling on the curved road on which the median strip is installed in the nighttime based on the image information IMG_inf, the map information MAP_inf, the steering information ST_inf, and the illuminance information II_inf, and when the vehicle is turning right, the lamp controller 50 may reduce the light irradiation range by decreasing the code value of the light range control code C_code.

In this connection, the lamp controller 50 determines the increase or decrease amount of the code value of the light range control code C_code based on the magnitude of the steering angle, so that amounts of the expansion and the reduction of the light irradiation range may be determined based on the magnitude of the steering angle of the vehicle.

A method of the lamp control device for the vehicle according to an embodiment of the present disclosure configured as described above will be described with reference to FIG. 3 as follows.

Operation S1 of determining whether the vehicle is currently traveling on the curved road on which the median strip is installed in the nighttime may be performed.

When the vehicle is not currently traveling in the nighttime, not traveling on the road on which the median strip is installed, or not traveling on the curved road (No), the generation of the light range control code C_code may be stopped. Thereafter, operation S1 may be performed again.

When it is determined that the vehicle is currently traveling on the curved road on which the median strip is installed in the nighttime (Yes), operation S2 of receiving the steering information ST_inf may be performed.

When the steering information ST_inf is received, operation S3 of firstly determining the steering direction may be performed.

When the steering direction included in the steering information ST_inf is the left direction (Yes), first determination operation S3-1 of determining the magnitude of the steering angle included in the steering information ST_inf may be performed.

When the steering angle included in the steering information ST_inf is smaller than a first allowable angle (an allowable angle 1) in first determination operation S3-1 (Yes), the code value of the light range control code C_code may not be increased. Thereafter, operation S1 may be performed again.

When the steering angle included in the steering information ST_inf is greater than the first allowable angle (allowable angle 1) (No), second determination operation S3-2 of determining the magnitude of the steering angle may be performed.

When the steering angle is smaller than a second allowable angle (an allowable angle 2) in second determination operation S3-2 (Yes), first lighting range expansion operation S3-2-1 of expanding the light irradiation range in a preset range may be performed. Thereafter, operation S1 may be performed again.

When the steering angle included in the steering information ST_inf is greater than the second allowable angle (the allowable angle 2) (No), third determination operation S3-3 of determining the magnitude of the steering angle may be performed.

When the steering angle is smaller than a third allowable angle (an allowable angle 3) in third determination operation S3-3 (Yes), second lighting range expansion operation S3-3-1 of expanding the light irradiation range in a range larger than the expansion of the light irradiation range performed in first lighting range expansion operation S3-2-1. Thereafter, operation S1 may be performed again.

When the steering direction included in the steering information ST_inf is not the left direction in operation S3 (No), operation S4 of determining whether the steering direction is the right direction may be performed.

When the steering direction is the right direction, fourth determination operation S4-1 of determining the magnitude of the steering angle included in the steering information ST_inf may be performed.

When the steering angle included in the steering information ST_inf is smaller than the first allowable angle (the allowable angle 1) in the fourth determination operation S4-1 (Yes), the code value of the light range control code C_code may not be reduced. Thereafter, operation S1 may be performed again.

When the steering angle included in the steering information ST_inf is greater than the first allowable angle (the allowable angle 1) (No), fifth determination operation S4-2 of determining the magnitude of the steering angle may be performed.

When the steering angle is smaller than the second allowable angle (the allowable angle 2) in the fifth determination operation S4-2 (Yes), first light turning-off range expansion operation S4-2-1 of reducing the light irradiation range in a preset range may be performed. Thereafter, operation S1 may be performed again.

When the steering angle included in the steering information ST_inf is greater than the second allowable angle (the allowable angle 2) (No), sixth determination operation S4-3 of determining the magnitude of the steering angle may be performed.

When the steering angle is smaller than the third allowable angle (the allowable angle 3) in the sixth determination operation S4-3 (Yes), second light turning-off range expansion operation S4-3-1 of reducing the light irradiation range in a range larger than the reduction of the light irradiation range performed in the first light turning-off range expansion operation S4-2-1 may be performed. Thereafter, operation S1 may be performed again.

Figure 6A:
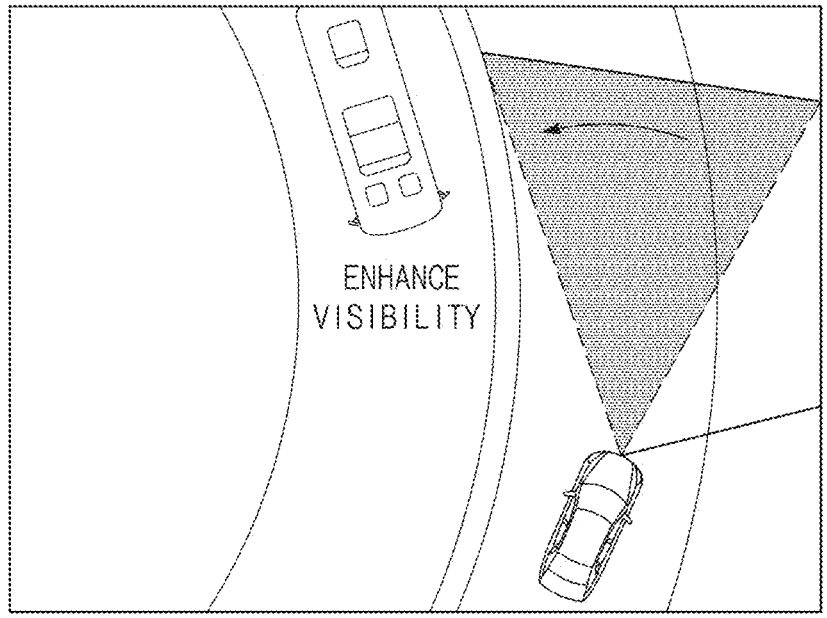
FIGS. 6A and 6B are a view for illustrating a function of a lamp control device for a vehicle according to the present disclosure.
Figure 6B:
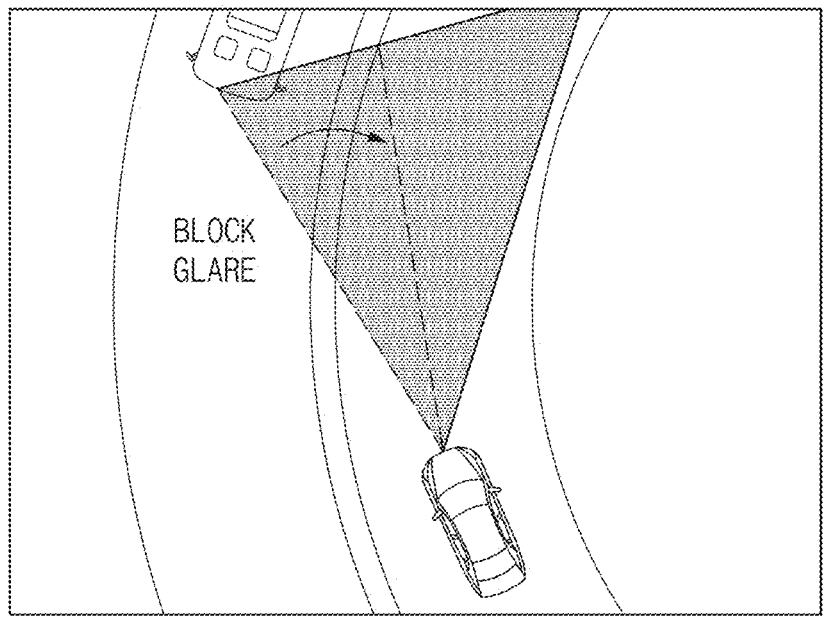

As such, when the vehicle is traveling on the curved road on which the median strip is installed in the nighttime, the lamp control device for the vehicle according to the present disclosure may expand or reduce the light irradiation range of the lamp based on the magnitude and the direction of the steering angle. Thus, as shown in FIGS. 6A and 6B, while enhancing visibility of a driver of a present vehicle, glare of a driver of another vehicle traveling on an opposite side around the median strip may be blocked.

Figure 4:
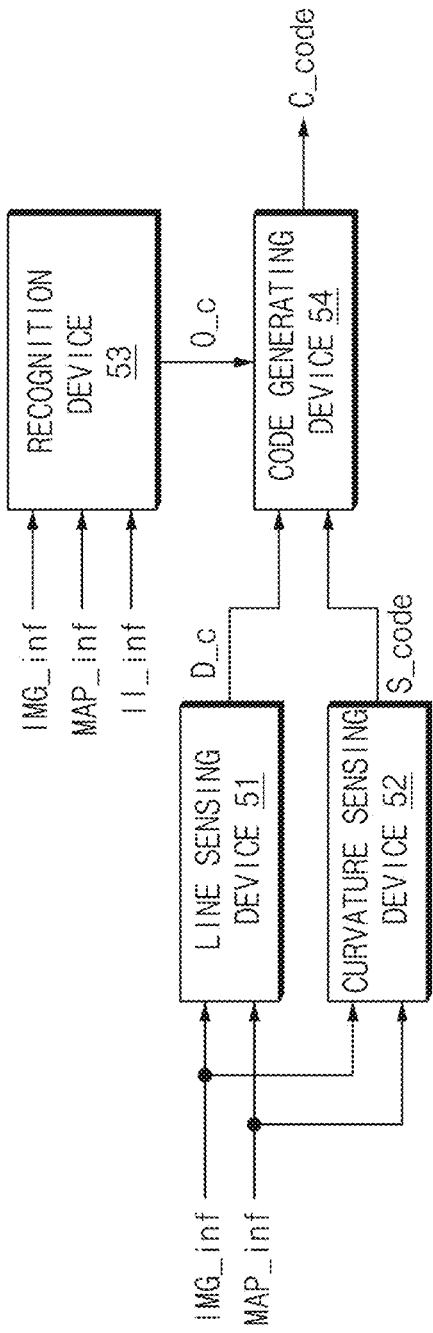
FIG. 4 is a view illustrating another embodiment of a lamp controller in a configuration of a lamp control device for a vehicle according to an embodiment of the present disclosure.
Figure 5:
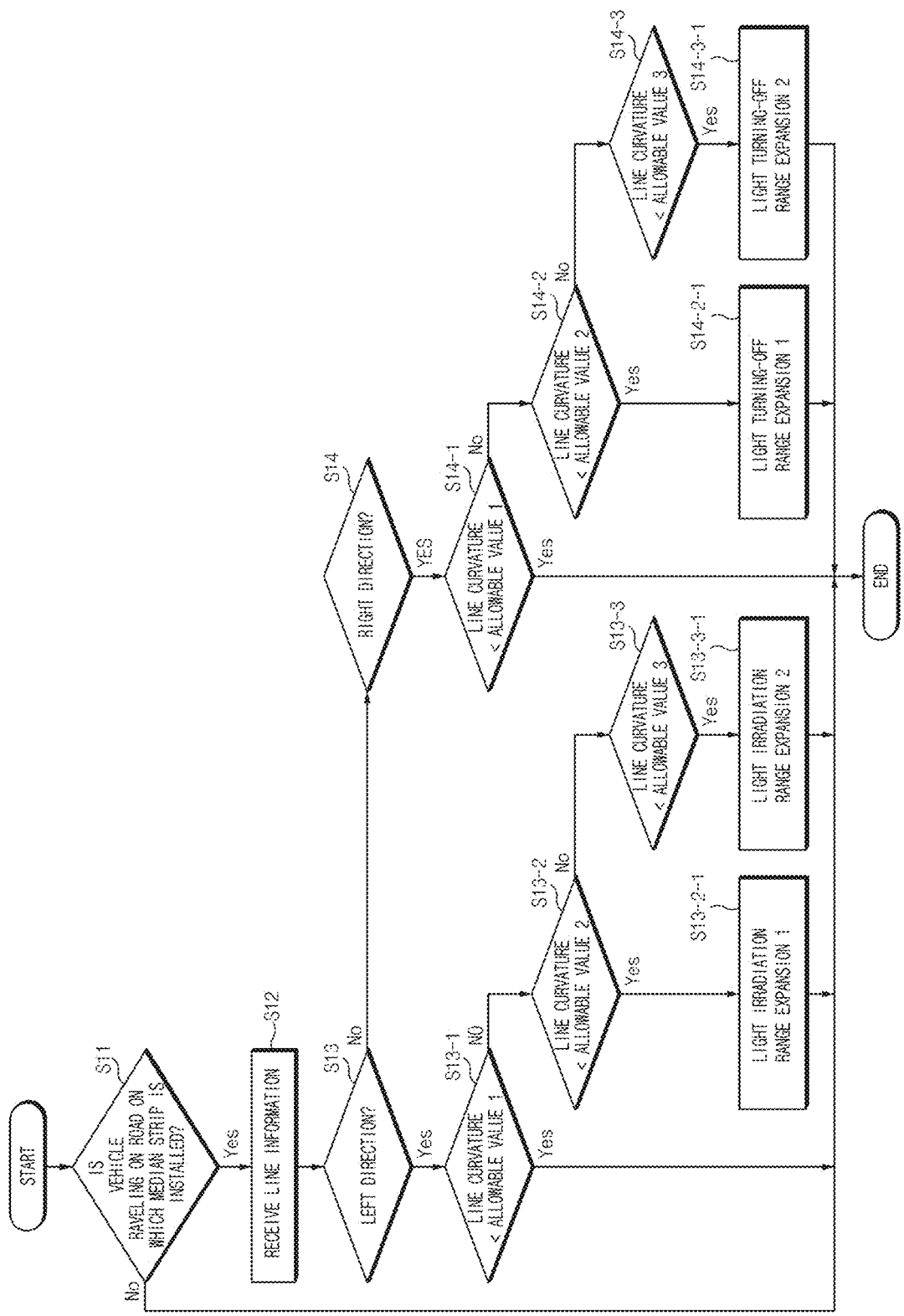
FIG. 5 is a flowchart illustrating a lamp control device for a vehicle including a lamp controller according to another embodiment of the present disclosure.

FIG. 4 is a view illustrating another embodiment of a lamp controller in a configuration of a lamp control device for a vehicle according to an embodiment of the present disclosure.

The lamp controller 50 shown in FIG. 4 may be a component, which is shown as an embodiment, capable of determining the increase or decrease amount in the code value of the light range control code C_code based on the image information IMG_inf and the map information MAP_inf, and increasing or decreasing the code value of the light range control code C_code based on the determined increase or decrease amount.

Referring to FIG. 4, the lamp controller 50 may include a line sensing device 51, a curvature sensing device 52, the recognition device 53, and the code generating device 54.

The line sensing device 51 may sense a line of the road on which the vehicle is currently traveling based on at least one of the image information IMG_inf or the map information MAP_inf to generate the direction sensing signal D_s.

For example, when a direction of the line is the left direction based on a line direction included in the image information IMG_inf, a line direction included in the map information MAP_inf, or the line directions included in the image information IMG_inf and the map information MAP_inf, the line sensing device 51 may enable the direction sensing signal D_s.

On the other hand, when the direction of the line is the right direction based on the line direction included in the image information IMG_inf, the line direction included in the map information MAP_inf, or the line directions included in the image information IMG_inf and the map information MAP_inf, the line sensing device 51 may disable the direction sensing signal D_s.

The curvature sensing device 52 may estimate a curvature of the line based on a line included in the image information IMG_inf, a line included in the map information MAP_inf, or the lines included in the image information IMG_inf and the map information MAP_inf, and output a magnitude of the estimated curvature as the magnitude code S_code.

For example, the curvature sensing device 52 may increase the code value of the magnitude code S_code when the magnitude of the estimated line curvature increases.

On the other hand, the curvature sensing device 52 may decrease the code value of the magnitude code S_code when the magnitude of the estimated line curvature decreases.

The recognition device 53 may generate the code generating signal O_c based on the image information IMG_inf, the map information MAP_inf, and the illuminance information Il_inf.

For example, when it is determined that the vehicle is currently traveling on the curved road on which the median strip is installed in the nighttime based on the image information IMG_inf, the map information MAP_inf, and the illuminance information Il_inf, the recognition device 53 may enable the code generating signal O_c.

When it is not the nighttime traveling, when the vehicle is not traveling on the road on which the median strip is installed, or when the vehicle is not traveling on the curved road based on the image information IMG_inf, the map information MAP_inf, and the illuminance information Il_inf, the recognition device 53 may disable the code generating signal O_c.

More specifically, the recognition device 53 may determine whether the vehicle is currently traveling on the curved road on which the median strip is installed based on at least one of the image information IMG_inf or the map information MAP_inf. That is, the recognition device 53 may determine whether the image of the front region of the vehicle is the curved road on which the median strip is installed based on the image information IMG_inf. In addition, the recognition device 53 may determine whether the road which the vehicle is currently traveling on is the curved road on which the median strip is installed based on the map information MAP_inf. Preferably, it may be most accurate for the recognition device 53 to determine whether the vehicle is traveling on the curved road on which the median strip is installed based on the image information IMG_inf and the map information MAP_inf.

The recognition device 53 may distinguish the nighttime and the daytime from each other based on the illuminance information Il_inf.

Therefore, the recognition device 53 may determine whether the vehicle is currently traveling on the curved road on which the median strip is installed in the nighttime based on the image information IMG_inf, the map information MAP_inf, and the illuminance information Il_inf, and enable the code generating signal O_c.

When the code generating signal O_c is disabled, the code generating device 54 may stop generation of the light range control code C_code regardless of the direction sensing signal D_s and the magnitude code S_code.

On the other hand, when the code generating signal O_c is enabled, the code generating device 54 may generate the light range control code C_code based on the direction sensing signal D_s and the magnitude code S_code.

A. For example, when the code generating signal O_c is enabled, the code generating device 54 may increase or decrease the code value of the light range control code C_code based on the direction sensing signal D_s by the code value corresponding to the code value of the magnitude code S_code.

More specifically, when the code generating signal O_c is enabled and the direction sensing signal D_s is enabled, the code generating device 54 may increase the code value of the light range control code C_code by the code value corresponding to the code value of the magnitude code S_code.

When the code generating signal O_c is enabled and the direction sensing signal D_s is disabled, the code generating device 54 may reduce the code value of the light range control code C_code by the code value corresponding to the code value of the magnitude code S_code.

Therefore, when it is determined that the vehicle is currently travelling on the curved road on which the median strip is installed in the nighttime based on the image information IMG_inf, the map information MAP_inf, and the illuminance information Il_inf, the lamp controller 50 in FIG. 4 may increase or decrease the code value of the light range control code C_code based on at least one of the image information IMG_inf or the map information MAP_inf. In this connection, the lamp controller 50 may determine the increase or decrease amount of the light range control code C_code and the increase or decrease of the light range control code C_code based on at least one of the image information IMG_inf or the map information MAP_inf.

Eventually, when it is determined that the vehicle is currently travelling on the curved road on which the median strip is installed in the nighttime based on the image information IMG_inf, the map information MAP_inf, the steering information ST_inf, and the illuminance information Il_inf, and when the line is the left turn section, the lamp controller 50 may expand the light irradiation range by increasing the code value of the light range control code C_code.

On the other hand, when it is determined that the vehicle is currently travelling on the curved road on which the median strip is installed in the nighttime based on the image information IMG_inf, the map information MAP_inf, the steering information ST_inf, and the illuminance information Il_inf, and when the line is the right turn section, the lamp controller 50 may reduce the light irradiation range by decreasing the code value of the light range control code C_code.

In this connection, the lamp controller 50 determines the increase or decrease amount of the code value of the light range control code C_code based on the line curvature based on at least one of the image information IMG_inf or the map information MAP_inf, so that the amounts of the expansion and the reduction of the light irradiation range may be determined based on the magnitude of the line curvature.

A method of the lamp control device for the vehicle according to an embodiment of the present disclosure configured as described above will be described with reference to FIG. 5 as follows.

Operation S11 of determining whether the vehicle is currently traveling on the curved road on which the median strip is installed in the nighttime may be performed.

When the vehicle is not currently traveling in the nighttime, not traveling on the road on which the median strip is installed, or not traveling on the curved road (No), the generation of the light range control code C_code may be stopped. Thereafter, operation S11 may be performed again.

When it is determined that the vehicle is currently traveling on the curved road on which the median strip is installed in the nighttime (Yes), operation S12 of receiving the line information (e.g., the line direction and the line curvature) based on at least one of the image information IMG_inf or the map information MAP_inf may be performed.

When the line information is received, operation S13 of firstly determining the line direction may be performed.

When the line direction included in the line information is the left direction (Yes), first determination operation S13-1 of determining the magnitude of the line curvature included in the line information may be performed.

When the line curvature included in the line information is smaller than a first allowable value (an allowable value 1) in first determination operation S13-1 (Yes), the code value of the light range control code C_code may not be increased. Thereafter, operation S11 may be performed again.

When the line curvature included in the line information is greater than the first allowable value (allowable value 1) (No), second determination operation S13-2 of determining the magnitude of the line curvature may be performed.

When the curvature is smaller than a second allowable value (an allowable value 2) in second determination operation S13-2 (Yes), first lighting range expansion operation S13-2-1 of expanding the light irradiation range in a preset range may be performed. Thereafter, operation S11 may be performed again.

When the line curvature included in the line information is greater than the second allowable value (the allowable value 2) (No), third determination operation S13-3 of determining the magnitude of the line curvature may be performed.

When the line curvature is smaller than a third allowable value (an allowable value 3) in third determination operation S13-3 (Yes), second lighting range expansion operation S13-3-1 of expanding the light irradiation range in a range larger than the expansion of the light irradiation range performed in first lighting range expansion operation S13-2-1. Thereafter, operation S11 may be performed again.

When the line direction included in the line information is not the left direction in operation S13 (No), operation S14 of determining whether the line direction is the right direction may be performed.

When the line direction is the right direction, fourth determination operation S14-1 of determining the magnitude of the line curvature included in the line information may be performed.

When the line curvature included in the line information is smaller than the first allowable value (the allowable value 1) in the fourth determination operation S14-1 (Yes), the code value of the light range control code C_code may not be reduced. Thereafter, operation S11 may be performed again.

When the line curvature included in the line information is greater than the first allowable value (the allowable value 1) (No), fifth determination operation S14-2 of determining the magnitude of the line curvature may be performed.

When the line curvature is smaller than the second allowable value (the allowable value 2) in the fifth determination operation S14-2 (Yes), first light turning-off range expansion operation S14-2-1 of reducing the light irradiation range in a preset range may be performed. Thereafter, operation S11 may be performed again.

When the line curvature included in the line information is greater than the second allowable value (the allowable value 2) (No), sixth determination operation S14-3 of determining the magnitude of the line curvature may be performed.

When the line curvature is smaller than the third allowable value (the allowable value 3) in the sixth determination operation S14-3 (Yes), second light turning-off range expansion operation S14-3-1 of reducing the light irradiation range in a range larger than the reduction of the light irradiation range performed in the first light turning-off range expansion operation S14-2-1 may be performed. Thereafter, operation S11 may be performed again.

As such, when the vehicle is traveling on the curved road on which the median strip is installed in the nighttime, the lamp control device for the vehicle according to the present disclosure may expand or reduce the light irradiation range of the lamp based on the direction and the curvature of the line estimated based on the image information and the map information. Thus, as shown in FIGS. 6A and 6B, while enhancing the visibility of the driver of the present vehicle, the glare of the driver of another vehicle traveling on the opposite side around the median strip may be blocked.

The lamp control device for the vehicle according to the present disclosure expands the light irradiation range based on the steering angle or the curvature of the line when the vehicle turns left or in the left turn section, as shown in FIG. 6A, but is able to expand the light irradiation range only to an extent in which the light irradiation range does not reach the median strip. In addition, the lamp control device for the vehicle according to the present disclosure reduces the light irradiation range based on the steering angle or the curvature of the line when the vehicle turns right or in the right turn section, but is able to reduce the light irradiation range only to the extent in which the light irradiation range does not reach the median strip.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present technology may predict the curvature of the line to change the high beam pattern, thereby maximizing an efficiency of the beam pattern.

In addition, the present technology may expand or reduce the light irradiation range by the amount corresponding to the steering angle or the predicted curvature of the line, thereby enhancing the visibility of the driver of the present vehicle and blocking the glare of another vehicle.

In addition, the present technology is advantageous in cost reduction because the present technology may be applied to the vehicle without adding sensor cost, by using the existing sensors installed in the vehicle.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lighting device for a vehicle, the device comprising:
   a lamp controller configured to:
      determine whether to change a light range control code based on at least one of image information, map information and illuminance information of a front region of the vehicle; and
      determine, based on steering information including a steering direction and steering angle, whether to increase or decrease the light range control code and an increase or decrease amount of the light range control code; and
   a lamp configured to expand or reduce a light irradiation range based on the light range control code,
   wherein the lamp controller is further configured to:
      generate a direction sensing signal based on a steering direction included in the steering information;
      generate a magnitude code based on a steering angle included in the steering information;
      generate a code generating signal based on the at least one of the image information, the map information and the illuminance information; and
      generate the light range control code based on at least one of the code generating signal, the direction sensing signal and the magnitude code.

2. The lighting device of claim 1, wherein the lamp controller is configured to generate the light range control code based on the steering information when a traveling road is determined to be a curved road with a median strip installed based on at least one of the image information or the map information, and when a current time is determined to be nighttime based on the illuminance information.

3. The lighting device of claim 1, wherein the lamp controller is configured to:
   determine whether to increase or decrease the light range control code based on the steering direction; or
   determine the increase or decrease amount of the light range control code based on the steering angle.

4. The lighting device of claim 3, wherein the lamp controller is configured to:
   increase a code value of the light range control code when the steering direction is a left direction, and decrease the code value of the light range control code when the steering direction is a right direction; or
   increase the code value of the light range control code when the steering angle increases, and decrease the code value of the light range control code when the steering angle decreases.

5. The lighting device of claim 3, wherein the lamp controller is further configured to increase or decrease a code value of the light range control code based on a determined increase or decrease amount of the code value when the increase or decrease amount of the code value of the light range control code is determined.

6. The lighting device of claim 3, wherein the lamp controller includes:
   a direction sensing device configured to generate the direction sensing signal based on the steering direction;
   a magnitude sensing device configured to generate the magnitude code based on the steering angle;
   a recognition device configured to generate the code generating signal based on the at least one of the image information, the map information and the illuminance information; and
   a code generating device configured to generate the light range control code based on at least one of the code generating signal, the direction sensing signal and the magnitude code.

7. The lighting device of claim 6, wherein the direction sensing device is configured to:
   enable the direction sensing signal when the steering direction is a left direction; and
   disable the direction sensing signal when the steering direction is a right direction.

8. The lighting device of claim 6, wherein the magnitude sensing device is configured to:
   increase a code value of the magnitude code when the steering angle increases; and
   decrease the code value of the magnitude code when the steering angle decreases.

9. The lighting device of claim 6, wherein the recognition device is configured to enable the code generating signal when the vehicle is determined to be currently traveling on a curved road with a median strip installed at nighttime based on the at least one of the image information, the map information and the illuminance information.

10. The lighting device of claim 6, wherein the code generating device is configured to:
    increase a code value of the light range control code by a first amount corresponding to the magnitude code when the code generating signal is enabled and the direction sensing signal is enabled; and
    decrease the code value of the light range control code by a second amount corresponding to the magnitude code when the code generating signal is enabled and the direction sensing signal is disabled.

11. A lighting device for a vehicle, comprising:
    a lamp controller configured to:
       determine whether to change a light range control code based on at least one of image information, map information and illuminance information of a front region of the vehicle; and
       determine, based on at least one of the image information and the map information, whether to increase or decrease the light range control code and an increase or decrease amount of the light range control code; and
    a lamp configured to expand or reduce a light irradiation range based on the light range control code,
    wherein the lamp controller is further configured to:
       generate a direction sensing signal based on a line direction included in at least one of the image information and the map information;
       estimate a line curvature based on at least one of the image information and the map information; and
       generate a magnitude code based on the estimated line curvature;
       generate a code generating signal based on the at least one of the image information, the map information and the illuminance information; and generate the light range control code based on at least one of the code generating signal, the direction sensing signal and the magnitude code.

12. The lighting device of claim 11, wherein the lamp controller is configured to generate the light range control code based on the at least one of the image information and the map information when a traveling road is determined to be a curved road with a median strip installed based on at least one of the image information and the map information, and when a current time is determined to be nighttime based on the illuminance information.

13. The lighting device of claim 11, wherein the lamp controller is further configured to:
determine whether to increase or the decrease the light range control code based on the line direction; and
determine the increase or decrease amount of the light range control code based on the line curvature.

14. The lighting device of claim 13, wherein the lamp controller is configured to:
increase a code value of the light range control code when the line direction is a left direction, and decrease the code value of the light range control code when the line direction is a right direction; or
increase the code value of the light range control code when the line curvature increases, and decrease the code value of the light range control code when the line curvature decreases.

15. The lighting device of claim 13, wherein the lamp controller is configured to increase or decrease a code value of the light range control code by a determined increase or decrease amount of the code value when the increase or decrease amount of the code value of the light range control code is determined.

16. The lighting device of claim 13, wherein the lamp controller includes:
a line sensing device configured to generate the direction sensing signal based on the line direction;
a curvature sensing device configured to:
estimate the line curvature based on at least one of the image information and the map information; and
generate a magnitude code based on the estimated line curvature;
a recognition device configured to generate the code generating signal based on at least one of the image information, the map information and the illuminance information; and
a code generating device configured to generate the light range control code based on at least one of the code generating signal, the direction sensing signal and the magnitude code.

17. The lighting device of claim 16, wherein the line sensing device is configured to:
enable the direction sensing signal when the line direction is a left direction; and
disable the direction sensing signal when the line direction is a right direction.

18. The lighting device of claim 16, wherein the curvature sensing device is configured to:
increase a code value of the magnitude code when the line curvature increases; and
decrease the code value of the magnitude code when the line curvature decreases.

19. The lighting device of claim 16, wherein the recognition device is configured to enable the code generating signal when the vehicle is determined to be currently traveling on a curved road with a median strip installed at nighttime based on the at least one of the image information, the map information and the illuminance information.

20. The lighting device of claim 16, wherein the code generating device is configured to:
increase a code value of the light range control code by a first amount corresponding to the magnitude code when the code generating signal is enabled and the direction sensing signal is enabled; and
decrease the code value of the light range control code by a second amount corresponding to the magnitude code when the code generating signal is enabled and the direction sensing signal is disabled.

* * * * *